United States Patent
Gaunt et al.

(10) Patent No.: US 12,460,746 B2
(45) Date of Patent: Nov. 4, 2025

(54) METHOD AND APPARATUS FOR TRENCHLESS EXTRACTION OF PIPE

(71) Applicant: The Tunneling Company Inc., Alberta (CA)

(72) Inventors: Shawn Gaunt, Kamloops (CA); Elliott Brown, Kamloops (CA)

(73) Assignee: The Tunneling Company Inc., Alberta (CA)

( * ) Notice: Subject to any disclaimer, the term of this patent is extended or adjusted under 35 U.S.C. 154(b) by 250 days.

(21) Appl. No.: 18/315,393

(22) Filed: May 10, 2023

(65) Prior Publication Data
US 2023/0366485 A1 Nov. 16, 2023

(30) Foreign Application Priority Data
May 11, 2022 (CA) .................... CA 3158674

(51) Int. Cl.
*F16L 1/028* (2006.01)
(52) U.S. Cl.
CPC ..................... *F16L 1/028* (2013.01)
(58) Field of Classification Search
CPC ... F16L 1/028; F16L 1/06; F16L 1/036; F16L 1/032
See application file for complete search history.

(56) References Cited

U.S. PATENT DOCUMENTS

| | | | |
|---|---|---|---|
| 4,658,901 A | 4/1987 | Alexander | |
| 6,652,190 B1 | 11/2003 | Verkyk | |
| 8,596,918 B2 | 12/2013 | Tjader | |
| 10,422,441 B2 | 9/2019 | Olander | |
| 10,539,254 B2 | 1/2020 | Zillante et al. | |
| 2003/0165360 A1 | 9/2003 | Wentworth et al. | |
| 2009/0003935 A1 | 1/2009 | Puttmann | |
| 2014/0030024 A1 | 1/2014 | Cilliers | |

FOREIGN PATENT DOCUMENTS

| | | |
|---|---|---|
| CA | 2891805 | 11/2016 |
| DE | 10261554 | 5/2004 |
| EP | 0857830 | * 12/1998 |

OTHER PUBLICATIONS

European Patent Office. Extended European Search Report, for corresponding application 23172916.1, mailed Sep. 13, 2023.

* cited by examiner

*Primary Examiner* — Sean D Andrish
(74) *Attorney, Agent, or Firm* — Quarles & Brady, LLP

(57) ABSTRACT

Apparatus for trenchless extraction of pipe includes a housing rigidly connectable to a pipe to be extracted, a tension helmet disposed over an end of the housing, the tension helmet connected by tensile elements to a hydraulic impact hammer supported by the housing, and resilient shock absorber disposed between the tension helmet and the housing. The hammer is operated to impact a striker plate on the housing, which drives the pipe to be extracted forward and thereby creating a gap between the striker plate and the hammer and compress the shock absorber. The shock absorber then resiliently expands, thereby pushing the tension helmet forward and bringing the hammer back into alignment with the striker plate.

4 Claims, 4 Drawing Sheets

METHOD AND APPARATUS FOR TRENCHLESS EXTRACTION OF PIPE

CROSS REFERENCE TO RELATED APPLICATION

This application claims the benefit of Canadian Application No. 3,158,674, filed May 11, 2022, the disclosure of which is hereby incorporated by reference in its entirety for all purposes.

TECHNICAL FIELD

This invention relates to the removal of underground pipe. In particular, this invention relates to methods for trenchless extraction of pipe and apparatus therefor.

BACKGROUND

Periodically, pipes need to be removed and replaced. Conventionally, pipes may be removed by digging a trench to the depth of the buried pipe and extracting the pipe. However, as buried pipes are often subsequently constructed over, for example with buildings or roads, digging a trench in order to extract a pipe is not desirable, or even possible, in many cases.

Destructive methods of trenchless pipe replacement are known. One example, US Patent Application Ser. No. 2003/0165360, discloses an impactor pulled by a directional drilling machine by means of a drill string. The impactor is pulled through an existing pipeline, bursting it into fragments which remain in the ground. The replacement pipe is drawn along behind the impactor and occupies the same space as the existing pipeline.

Another example, US Patent Application Ser. No. 2014/0030024, discloses a component for removing a pipe, the component being securable to a cable and having a sleeve to surround an end of the pipe, the sleeve adapted to seal the end of the pipe. The free end of the cable is passed through the pipe and connected to a winch. A settable fluid is introduced through the component into the pipe and around the cable. Once the settable fluid has sufficiently hardened, the winch is actuated to draw the pipe out of the earth.

In both of these apparatus, the original pipe is no longer usable. However, in many cases the original pipe may not be irredeemably deteriorated and could be refurbished and subsequently reused.

Accordingly, there is a general desire for non-destructive trenchless extraction of pipe.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an apparatus for trenchless extraction of pipe. The pipe extraction apparatus comprises a housing having a first end and an opposing second end. A striker plate is mounted to the first end of the housing and the second end is attachable to an exposed end of a pipe to be extracted from a surrounding substrate. A percussive hammer is supported by cradles within the housing for alignment with the striker plate. The hammer is longitudinally displaceable relative to the striker plate. A tension helmet is disposed over the first end of the housing and is slidably displaceable relative to the housing. Tensile elements, such as cables, connect the tension helmet to a yoke on the hammer and urge the hammer against the striker plate. A shock absorber, preferably a pneumatic shock absorber, is disposed between the tension helmet and the first end of the housing, coupling the tension helmet to the housing. The shock absorber, when in a rest configuration (that is, uncompressed), pushes the tension helmet away from the first end, thereby pulling the hammer via the tensile elements such that the hammer abuts the striker plate.

Another aspect of the invention provides a method for using the pipe extraction apparatus. The pipe extraction apparatus is rigidly attached to the exposed end of the pipe. The hammer is then operated to strike the striker plate, providing an impact force in a direction away from the surrounding substrate, thereby fractionally displacing the pipe out of the surrounding substrate. The displacement of the pipe momentarily creates a gap between the striker plate and the hammer and momentarily compresses the shock absorber between the tension helmet and the first end of the housing. As the shock absorber returns to its rest configuration, it urges the tension helmet away from the first end of the housing, thereby urging the hammer back against the striker plate. This process is repeated to extract the pipe fully from the surrounding substrate.

According to another aspect of the invention, a horizontal pipe extraction apparatus comprises a housing, the housing having a first end and a second end opposite the first end, the second end fixable to a pipe to be extracted, a striker plate disposed on the first end of the housing, a percussive hammer supported by the housing in alignment with the striker plate, the hammer longitudinally displaceable relative to the housing, a tension helmet disposed over the first end for slidable displacement relative to the housing, one or more tensile elements connecting the hammer to the tension helmet, and a resilient shock absorber disposed between and connected to the tension helmet and the first end, wherein the tensile elements urge the hammer against the striker plate when the shock absorber is in a rest configuration. The shock absorber may be a pneumatic shock absorber. The one or more tensile elements may be cables connecting the hammer to the tension helmet.

According to another aspect of the invention, a method of trenchless extraction of horizontal pipe comprises providing a pipe extraction apparatus, the pipe extraction apparatus comprising: a percussive hammer supported by a housing in alignment with a striker plate, the striker plate mounted to the housing, the hammer longitudinally displaceable relative to the housing, a tension helmet disposed over the striker plate and connected to the hammer by one or more tensile elements, and a shock absorber disposed between the striker plate and the tension helmet, mounting the pipe extraction apparatus to an exposed end of a pipe to be extracted from a surrounding substrate, operating the hammer to strike the striker plate repeatedly in a direction away from the surrounding substrate, thereby displacing the pipe out of the surrounding substrate incrementally, the shock absorber urging the tension helmet away from the striker plate after each successive strike, the tensile elements thereby urging the hammer toward the striker plate after each successive strike.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
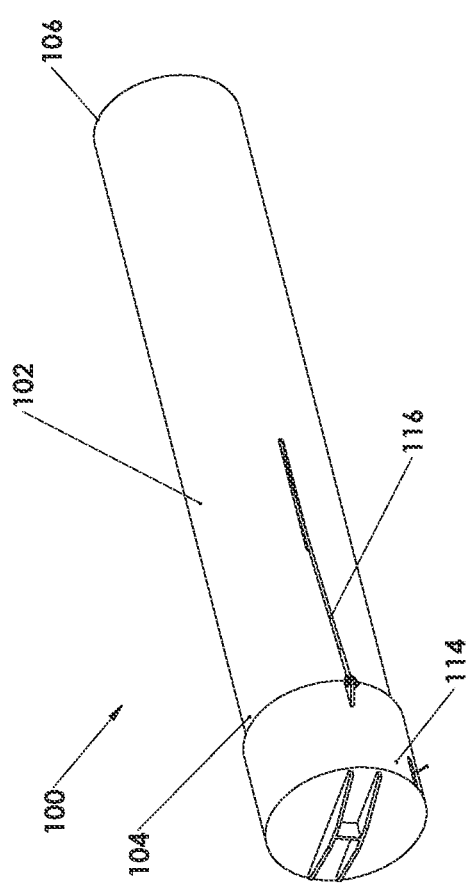
FIG. 1 is a perspective view according to a preferred embodiment of the invention of a pipe extraction apparatus.
Figure 2:
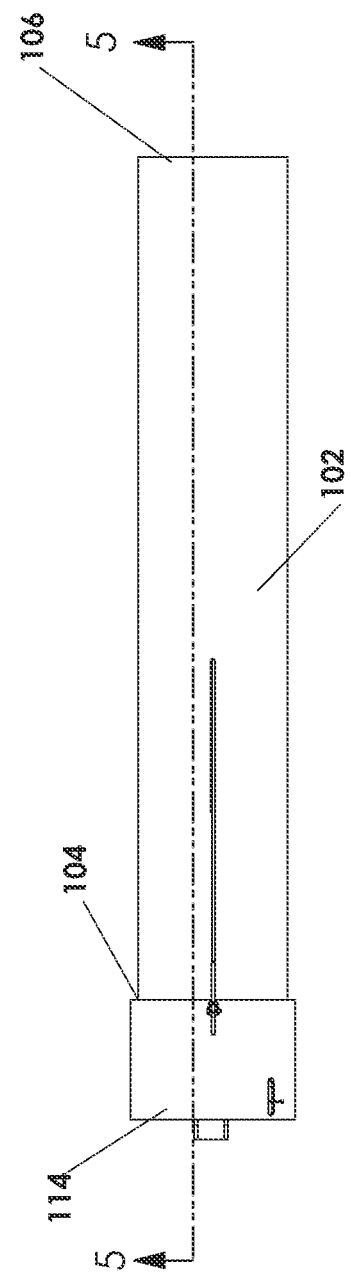
FIG. 2 is a side view of the pipe extraction apparatus of FIG. 1.
Figure 3:
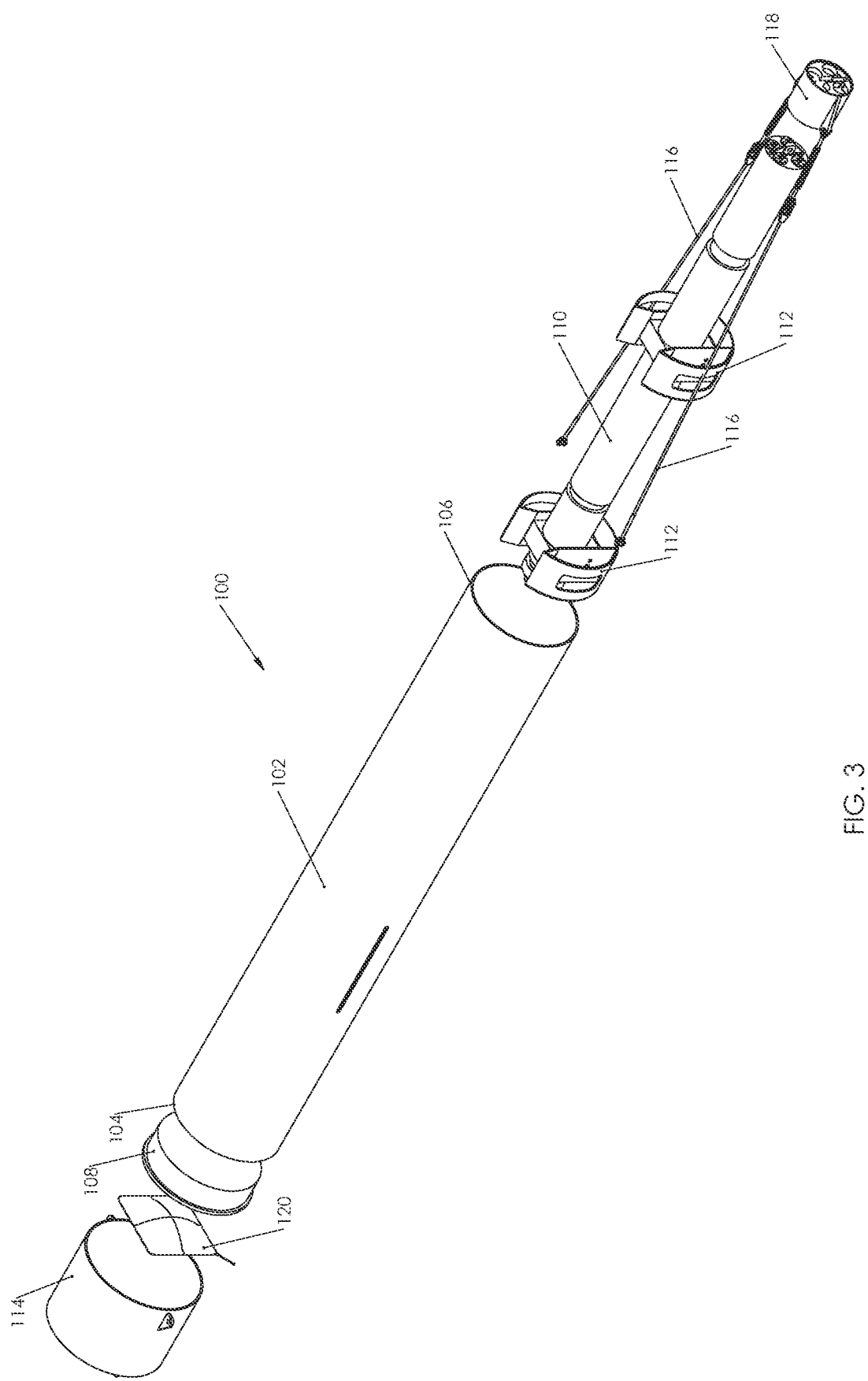
FIG. 3 is a perspective exploded view of the pipe extraction apparatus of FIG. 1.
Figure 4:
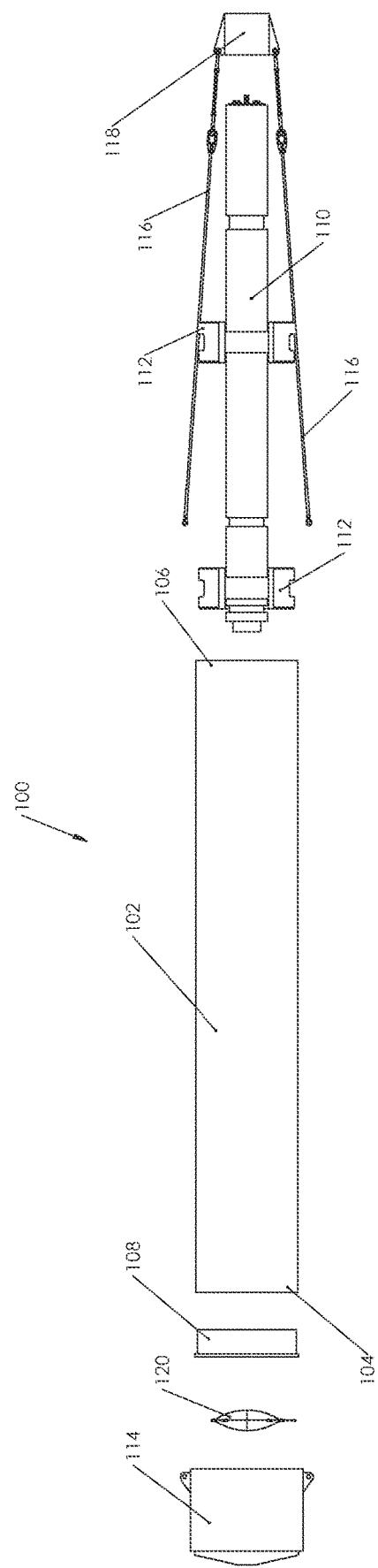
FIG. 4 is a top exploded view of the pipe extraction apparatus of FIG. 1.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Referring to FIGS. 1-4, according to a preferred embodiment of the invention, a pipe extraction apparatus 100 comprises a housing 102 having a first end 104 and a second end 106. The housing 102 may be conveniently fabricated from a section of pipe as shown, although the skilled person will recognize that other configurations of the housing 102 are possible. A striker plate 108 is disposed on or in the housing 102 at the first end 104. The second end 106 is configured to be rigidly attached (i.e. fixed) to an exposed end 15 of a desired pipe 10 to be extracted, for a non-limiting example by welding the second end 106 of the housing 102 to the exposed end 15. The second end 106 may further include adaptors (not shown) to allow the housing 106 to be used with differing diameters of pipe 10.

A percussive hammer 110 is supported within the housing 102. Preferably, the hammer 110 is a hydraulic hammer such as, but not limited to, the IHC S90 Hydrohammer available from IHC Hydrohammer B.V. For smaller diameter pipes 10, pneumatic hammers could also be used. Cradles 112 disposed within the housing 102 hold the hammer 110 in central alignment with striker plate 108 but do not restrain the hammer longitudinally. In some embodiments, the cradles 112 are mounted within the housing 102 and the hammer 110 slides relative to the cradles 112. In other embodiments, the cradles 112 are mounted to the hammer 110 and the cradles 112 slide relative to the housing 102. Accordingly, the hammer 110 is able to slide longitudinally within the housing 102 towards or away from the striker plate 108.

A tension helmet 114 is disposed over the first end 104 and is connected by one or more tensile elements 116 to a yoke 118 on the hammer 110. Preferably, the tensile elements 116 are tension cables. The tension helmet 114 is not fixed to the housing 102 but is capable of sliding motion relative to the first end 104. A shock absorber 120 disposed between the tension helmet 114 and the striker plate 108 couples the tension helmet 114 to the striker plate 108. The shock absorber 120 is resilient, tending to return to a rest state (that is, an uncompressed state) after being compressed. The shock absorber 120 is preferably a pneumatic shock absorber, but could also comprise elastomeric elements, dampened spring shock absorbers, and the like. When the shock absorber 120 is in its rest state as shown in FIG. 5A, the tension helmet 114 is pushed away from the striker plate 108, which in turn pulls the hammer 110 into engagement against the striker plate 108 by means of the tension cables 116.

Figure 5A:
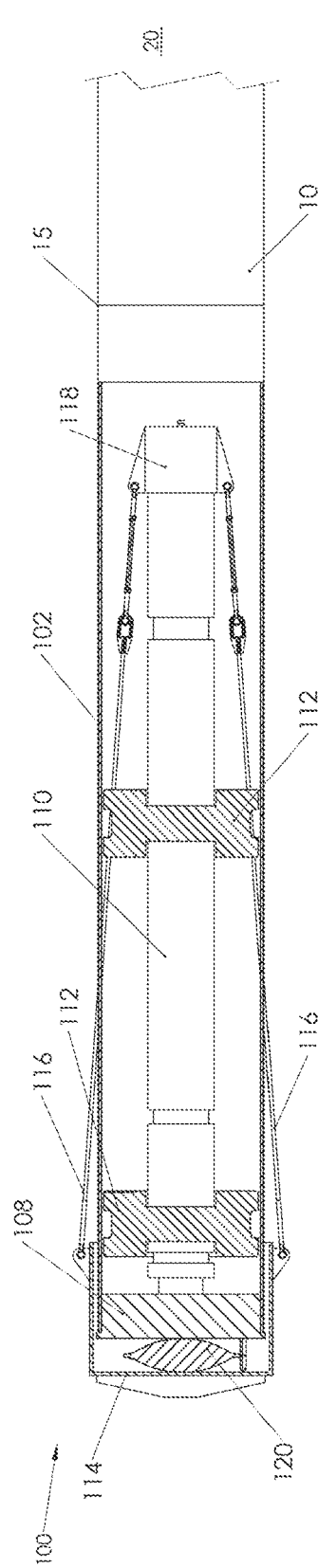
FIG. 5A is a top section view of the pipe extraction apparatus of FIG. 1 attached to a pipe to be extracted, taken along line 5-5 of FIG. 2, prior to a hammer strike.
Figure 5B:
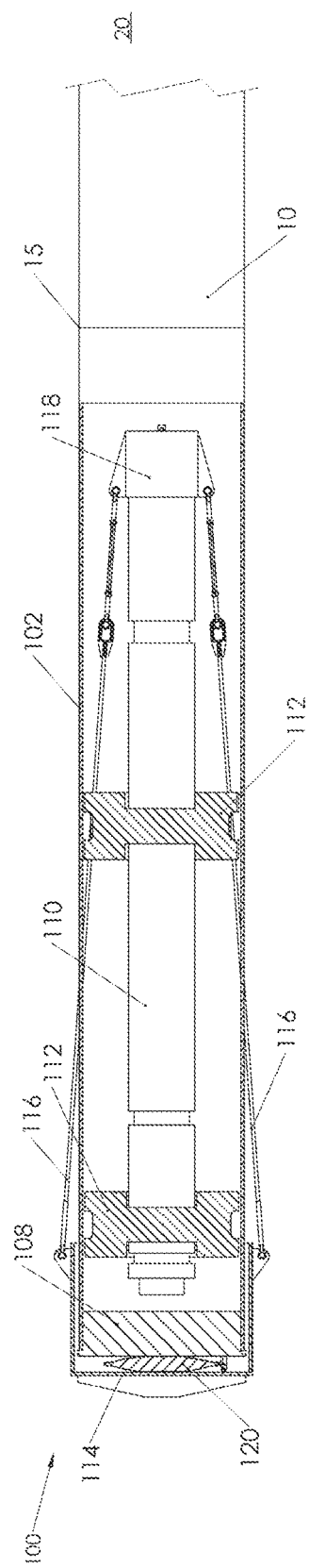
FIG. 5B is a top section view of the pipe extraction apparatus of FIG. 1 attached to a pipe to be extracted, taken along line 5-5 of FIG. 2, immediately following a hammer strike.
Figure 5C:
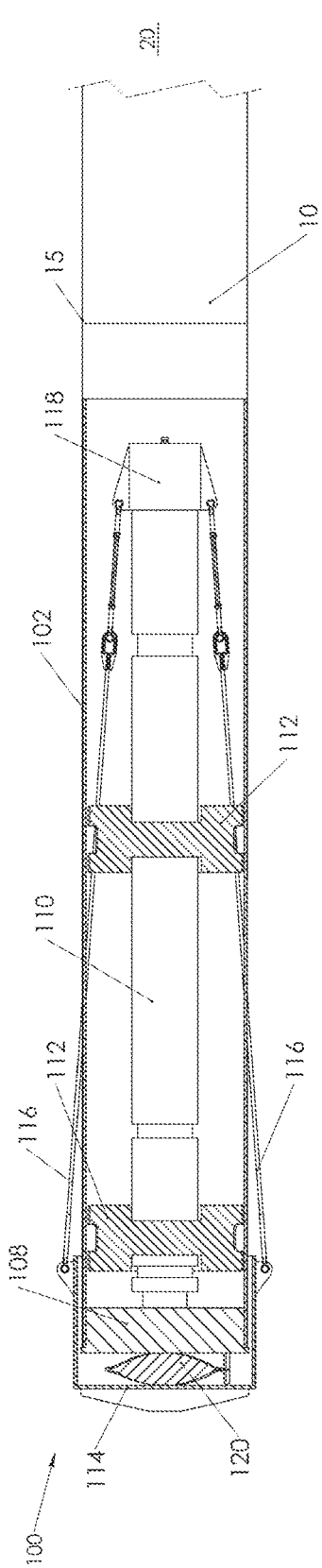
FIG. 5C is a top section view of the pipe extraction apparatus of FIG. 1 attached to a pipe to be extracted, taken along line 5-5 of FIG. 2, after the shock absorber returns to its rest configuration.

Referring to FIGS. 5A to 5C, the pipe extraction apparatus 100 is used by welding or otherwise rigidly mounting the housing 102 to the exposed end 15 of the pipe 10. The housing 102 may be suspended from cranes (not shown) during operation. The shock absorber 120 begins in its rest state in order to push the tension helmet away from the pipe 10, thereby urging the hammer 110 to abut the striker plate 108, as shown in FIG. 5A. The hammer 110 is then operated to impact the striker plate 108. The impact force is applied by the hammer 110 to the striker plate 108 in a direction away from a surrounding substrate 20 (for example, earth, soil, gravel infill, and the like), causing the housing 102 to jerk forward, that is, away from the surrounding substrate 20. As the housing 102 is rigidly mounted to the pipe 10, the pipe 10 is correspondingly extracted from the surrounding substrate 20 a short distance, as shown by FIGS. 5B and 5C.

As the tension helmet 114 is not directly mounted to the housing 102 but instead coupled to the housing 102 by means of the shock absorber 120, the tension helmet 114 and hammer 110 do not immediately move with the housing 102. Instead, the impact of the hammer 110 against the striker plate 108 momentarily creates a small gap between the hammer 110 and the striker plate 108, as shown in FIG. 5B. The forward movement of the housing 102 momentarily compresses the shock absorber 120 against the tension helmet 114, which temporarily remains stationary along with the hammer 110 due to the slidable freedom of movement between the housing 102 and the hammer 110 and tension helmet 114.

Following the impact-induced movement, friction between the pipe 10 and the surrounding substrate 20 holds the pipe 10, and by extension the housing 102, stationary. Accordingly, the striker plate 108 is effectively rigidly supported by the housing 102 and pipe 10. As a result, when the pneumatic shock absorber 120 expands back to its rest configuration, the tension helmet 114 advances forward and the tension cables 116 pull the hammer 110 to again abut the striker plate 108, as shown in FIG. 5C. This process repeats to incrementally extract the pipe 10 from the surrounding substrate 20.

Absent the shock absorber 120, the tension helmet 114 and hammer 110, would move simultaneously with the housing 102, inducing significant shock loading on both the hammer 110 and housing 102. This could lead to premature failure of either or both of the hammer 110 and housing 102. Advantageously, the shock absorber 120 absorbs a portion of the shock loading and prolongs the operating life of the extraction apparatus 100.

The pipe extraction apparatus 100 disclosed herein provides a self-contained method for trenchlessly extracting a pipe while causing a minimum of damage to the pipe. This allows for the pipe that is removed to be refurbished and repurposed, or recycled, rather than being left as fragments in situ that may contaminate the surrounding soil. The pipe extraction apparatus 100 requires access to only one end of the pipe to be extracted. The pipe extraction apparatus 100 is capable of relatively rapid extraction of pipe that may be 100 metres long or longer, and requires only modest time and additional equipment to set up.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A horizontal pipe extraction apparatus comprising:
   a housing, said housing having a first end and a second end opposite said first end, said second end fixable to a pipe to be extracted;
   a striker plate disposed on said first end of said housing;
   a percussive hammer supported by said housing in alignment with said striker plate, said hammer longitudinally displaceable relative to said housing;
   a tension helmet disposed over said first end for slidable displacement relative to said housing;
   one or more tensile elements connecting said hammer to said tension helmet; and
   a resilient shock absorber disposed between and connected to said tension helmet and said first end;
   wherein said one or more tensile elements urge said hammer against said striker plate when said shock absorber is in a rest configuration.

2. The pipe extraction apparatus of claim 1 wherein said shock absorber is a pneumatic shock absorber.

3. The pipe extraction apparatus of claim 1 wherein said one or more tensile elements are cables connecting said hammer to said tension helmet.

4. A method of trenchless extraction of horizontal pipe, said method comprising:
   providing a pipe extraction apparatus, said pipe extraction apparatus comprising:
      a percussive hammer supported by a housing in alignment with a striker plate, said striker plate mounted to said housing, said hammer longitudinally displaceable relative to said housing;
      a tension helmet disposed over said striker plate and connected to said hammer by one or more tensile elements; and
      a shock absorber disposed between said striker plate and said tension helmet; mounting said pipe extraction apparatus to an exposed end of a pipe to be extracted from a surrounding substrate; and
   operating said hammer to strike said striker plate repeatedly in a direction away from said surrounding substrate, thereby displacing said pipe out of said surrounding substrate incrementally, said shock absorber urging said tension helmet away from said striker plate after each successive strike, said one or more tensile elements thereby urging said hammer toward said striker plate after each successive strike.

* * * * *